US010929715B2

(12) United States Patent
Chinni (10) Patent No.: US 10,929,715 B2
(45) Date of Patent: Feb. 23, 2021

(54) SEMANTIC SEGMENTATION USING DRIVER ATTENTION INFORMATION

(71) Applicant: Robert Bosch GmbH, Stuttgart (DE)

(72) Inventor: Krishna Mohan Chinni, Canton, MI (US)

(*) Notice: Subject to any disclaimer, the term of this patent is extended or adjusted under 35 U.S.C. 154(b) by 63 days.

(21) Appl. No.: 16/388,190

(22) Filed: Apr. 18, 2019

(65) Prior Publication Data

US 2020/0210765 A1    Jul. 2, 2020

Related U.S. Application Data

(60) Provisional application No. 62/786,711, filed on Dec. 31, 2018.

(51) Int. Cl.
| | |
|---|---|
| *G06K 9/00* | (2006.01) |
| *G06K 9/62* | (2006.01) |
| *G06N 20/00* | (2019.01) |
| *G06N 3/08* | (2006.01) |
| *G05D 1/02* | (2020.01) |
| *G06K 9/46* | (2006.01) |

(52) U.S. Cl.
CPC ......... *G06K 9/6256* (2013.01); *G05D 1/0214* (2013.01); *G05D 1/0221* (2013.01); *G06K 9/00791* (2013.01); *G06K 9/00845* (2013.01); *G06K 9/4604* (2013.01); *G06K 9/6267* (2013.01); *G06N 3/08* (2013.01); *G06N 20/00* (2019.01); *G05D 2201/0213* (2013.01)

(58) Field of Classification Search
CPC .............. G06K 9/6256; G06K 9/00791; G06K 9/00845; G06K 9/4604; G06K 9/6267; G06N 20/00; G06N 3/08; G05D 1/0214; G05D 1/0221

USPC ......................................................... 382/104
See application file for complete search history.

(56) References Cited

U.S. PATENT DOCUMENTS

| | | | |
|---|---|---|---|
| 8,175,376 B2 | 5/2012 | Marchesotti et al. | |
| 9,886,621 B2 | 2/2018 | Gordon et al. | |
| 10,019,657 B2 | 7/2018 | Lin et al. | |
| 2017/0344021 A1 | 11/2017 | Sano et al. | |
| 2018/0232947 A1 | 8/2018 | Nehmadi et al. | |
| 2018/0307690 A1 | 10/2018 | Souche et al. | |
| 2019/0213429 A1* | 7/2019 | Sicconi | G06K 9/00335 |
| 2019/0265712 A1* | 8/2019 | Satzoda | B60W 40/09 |

* cited by examiner

*Primary Examiner* — Stephen P Coleman
(74) *Attorney, Agent, or Firm* — Michael Best & Friedrich LLP (57) ABSTRACT

Methods of creating trained semantic segmentation network models and operating vehicles using the model. One example method includes an outside view camera configured to capture images that represent an artificial representation of the driver's view, a driver-facing camera configured to capture a driver's eye movements, and an electronic controller. The electronic controller is configured to receive images from the cameras; calibrate the image of the driver's eye movement with the artificial driver view; create a pixel weighted heat map of the calibrated images; create a trained semantic segmentation neural network model and a trained attention neural network model using the pixel weighted heat map and the artificial driver view; and operate the vehicle using the trained semantic segmentation neural network model and the trained attention neural network model.

17 Claims, 10 Drawing Sheets

SEMANTIC SEGMENTATION USING DRIVER ATTENTION INFORMATION

CROSS REFERENCE TO RELATED APPLICATIONS

This application claims priority to U.S. Provisional Patent Application No. 62/786,711, filed Dec. 31, 2018, the entire contents of which is incorporated by reference in its entirety.

FIELD

Embodiments relate to, among other things, acquiring training data for an attention neural network model and using the trained model for autonomous driving functions.

BACKGROUND

Modern vehicles include autonomous or semi-autonomous driving functionality that utilizes semantic segmentation network models. These segmentation network models are trained, for example, with respect to object identification and labels assigned to each pixel within the defined objects.

SUMMARY

The importance of pixels is ignored during the training of the segmentation network models and every pixel is viewed equally. In reality, pixels have different relevance and some pixels should be viewed as more important than others. While segmentation network models are known, training segmentation network models incorporating the use of weighted pixels to represent different importance is either not available or not implemented with the usage of driver eye tracking.

Embodiments described herein provide, among other things, a system and a method for using a semantic segmentation model that is trained with data acquired to incorporate pixel weighting based on importance.

One embodiment provides a system for creating a trained semantic segmentation neural network model and a trained attention neural network model to operate a vehicle. The system includes an outside view camera, a driver-facing camera, and one or more electronic controllers. The one or more electronic controllers are configured to receive an image from the outside view camera and an image of a driver's eye movements from the driver-facing camera. The one or more electronic controllers are configured to calibrate the image of the driver's eye movements with the image from the outside view camera to create calibrated images used to create a pixel weighted heat map of the calibrated images. The one or more electronic controllers are also configured to create the trained semantic segmentation neural network model using the image from the outside view camera and to create the trained attention neural network model using the pixel weighted heat map. The one or more electronic controllers are configured to operate the vehicle using the trained semantic segmentation neural network model and the trained attention neural network model.

Another embodiment provides a method for creating a trained semantic segmentation neural network model and a trained attention neural network model to operate a vehicle. The method includes receiving, via one or more electronic controllers, an image from an outside view camera and an image of a driver's eye movements from a driver-facing camera. The method also includes calibrating, via the one or more electronic controllers, the image of the driver's eye movements with the image from the outside view camera to create calibrated images used to create a pixel weighted heat map of the calibrated images. The method also includes creating, via the one or more electronic controllers, the trained semantic segmentation neural network model using the image from the outside view camera and creating the trained attention neural network model using the pixel weighted heat map. The method also includes operating, via the one or more electronic controllers, the vehicle using the trained semantic segmentation neural network model and the trained attention neural network model.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on a non-transitory computer-readable medium) executable by one or more processors. For example, "control units" and "controllers" described in the specification can include one or more electronic processors, one or more memory modules including a non-transitory computer-readable medium, one or more communication interfaces, one or more application specific integrated circuits (ASICs), and various connections (for example, a system bus or one or more networks) connecting the various components.

Figure 1:
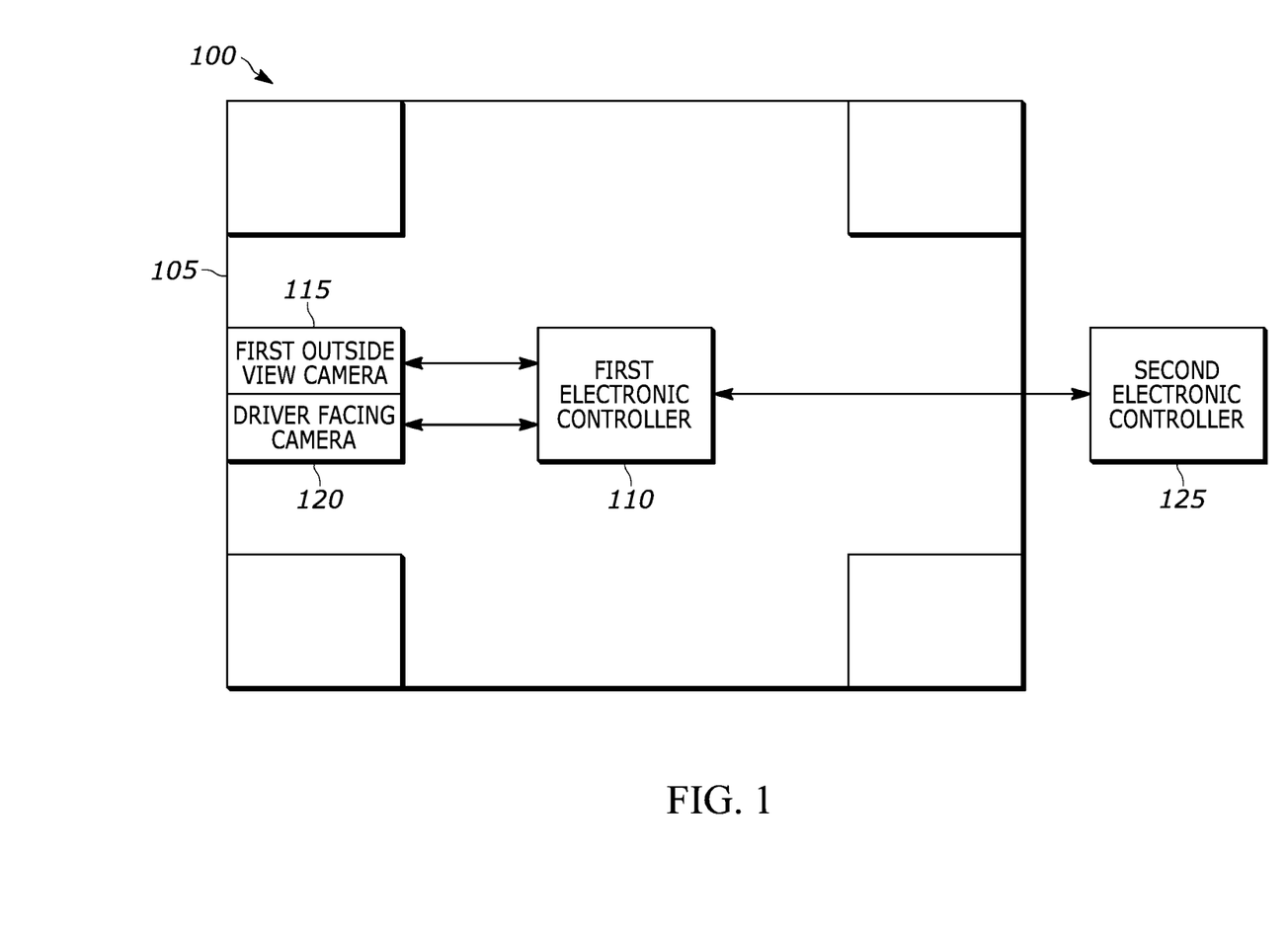
FIG. 1 is a block diagram of a system for improving the acquisition of training data for a semantic segmentation model according to one embodiment.

FIG. 1 illustrates a vehicle system 100 for calibrating images outside of the vehicle with captured driver eye movements used to train an attention neural network model. The system 100 includes a vehicle 105. The vehicle 105, although illustrated as a four-wheeled vehicle, may encompass various types and designs of vehicles. For example, the vehicle 105 may be an automobile, a motorcycle, a truck, a bus, a semi-tractor, and others. In the example illustrated, the vehicle 105 includes several hardware components including a first electronic controller 110, a first outside view camera 115, and a driver-facing camera 120. The first electronic controller 110 is communicatively connected to the first outside view camera 115, the driver-facing camera 120, and a second electronic controller 125 using one or more connections, for example, direct links and network connections (for example, a controller area network or CAN bus). Wired and wireless connections are possible.

The first outside view camera 115 is configured to capture images outside of the vehicle. The driver-facing camera 120 is configured to capture driver eye movements. The first outside view camera 115 and the driver-facing camera 120 provides data (images) to the first electronic controller 110 of the system 100.

In the example illustrated, the second electronic controller 125 is located external to the vehicle 105 and is communicatively connected to the first electronic controller 110 via one or more communication links and, in this example, via a wireless connection. However, the second electronic controller 125 may be located within the vehicle system 100 and connected via direct connections or via a vehicle network or bus.

Figure 2:
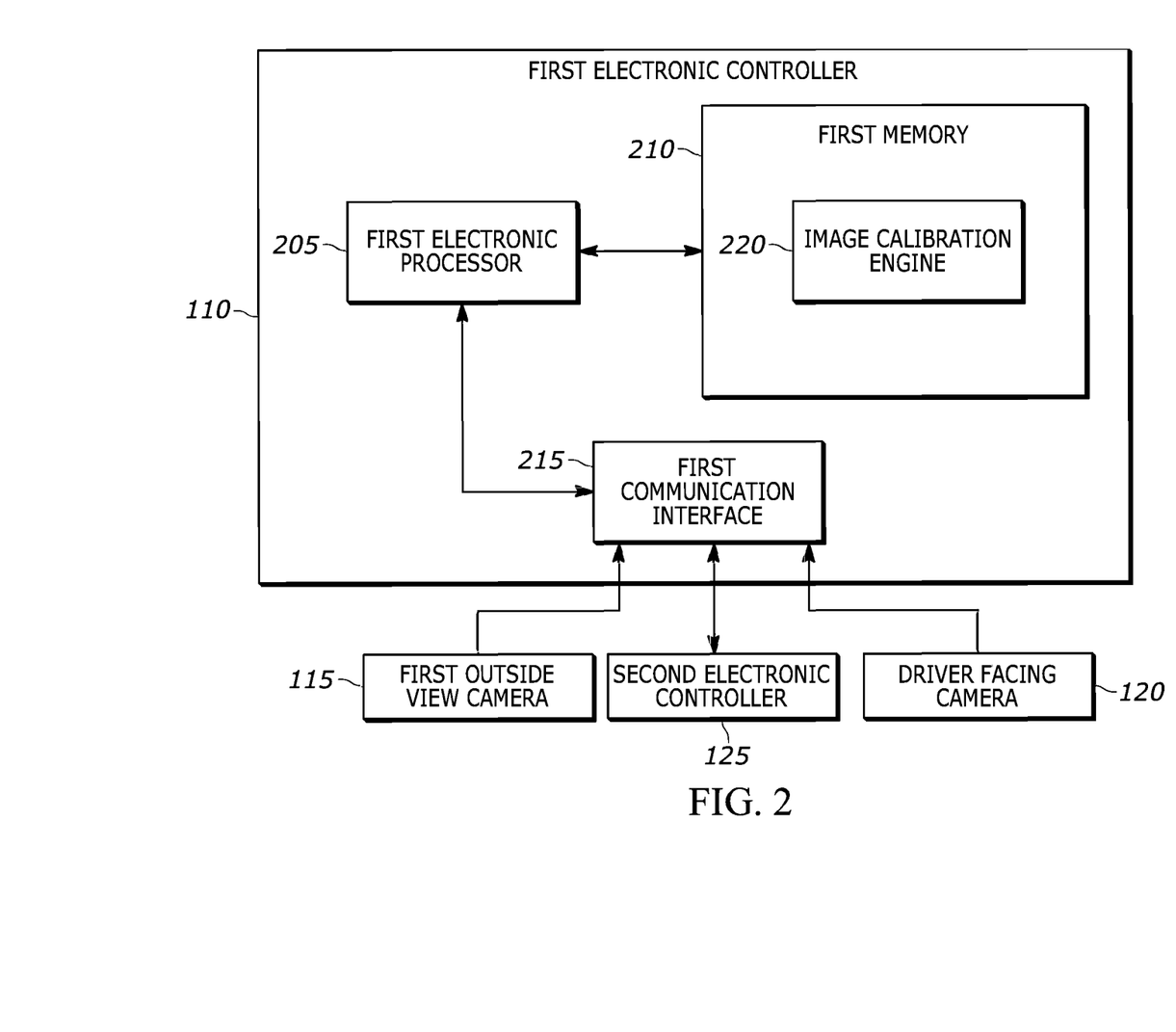
FIG. 2 is a block diagram of a first electronic controller of the system of FIG. 1 according to one embodiment.

FIG. 2 is a block diagram of the first electronic controller 110 of the system of FIG. 1. The first electronic controller 110 includes a plurality of electrical and electronic components that provide power, operation control, and protection to the components and modules within the first electronic controller 110. The first electronic controller 110 includes, among other things, a first electronic processor 205 (for example a programmable electronic microprocessor, microcontroller, or similar device) and a first memory 210. The first memory 210 is, for example, a non-transitory, machine readable memory. The first electronic controller also includes a first communication interface 215.

The first electronic processor 205 is communicatively connected to the first memory 210 and the first communication interface 215. The first memory 210 includes an image calibration engine 220. The image calibration engine 220, for example, is software or a set of computer-readable instructions that calibrates input from the first outside view camera 115 and the driver-facing camera 120. After the input is calibrated, the first electronic controller 110 is configured to provide the calibrated input and the input from the first outside view camera 115 to the second electronic controller 125. In other embodiments, the image calibration engine 220 may be located within the second electronic controller 125. In embodiments where the image calibration engine 220 is located within the second electronic controller 125, the first electronic controller 110 provides the input from the first outside view image 115 and the driver-facing camera 120 directly to the second electronic controller 125. The first electronic processor 205 in coordination with software stored in the first memory 210 (for example, the software described above), and the first communication interface 215 are configured to implement one or more of the methods described herein.

The first electronic controller 110 may be implemented in several independent controllers (for example, programmable electronic controllers) each configured to perform specific functions or sub-functions. Additionally, the first electronic controller 110 may contain sub-modules that include additional electronic processors, memory, or application specific integrated circuits (ASICs) for handling communication functions, processing of signals, and application of the methods listed below. In other embodiments, the first electronic controller 110 includes additional, fewer, or different components.

Figure 3:
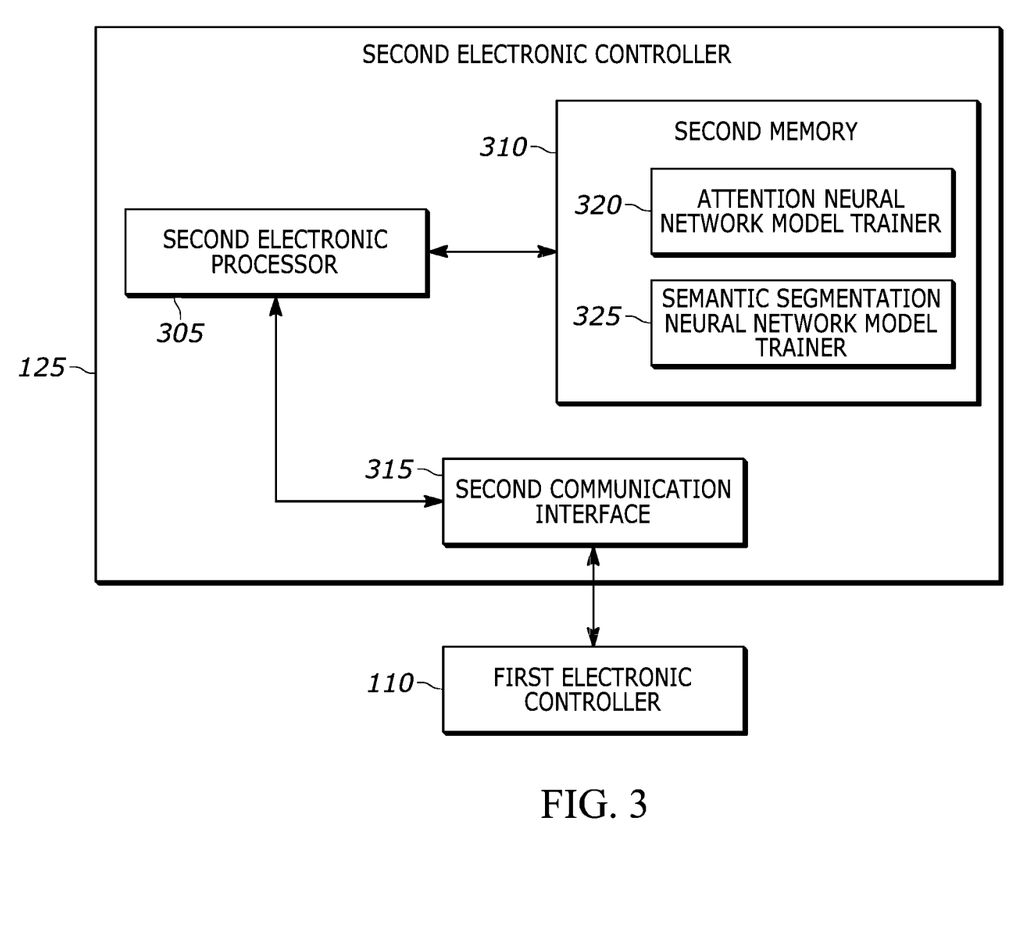
FIG. 3 is a block diagram of a second electronic controller of the system of FIG. 1 according to one embodiment.

FIG. 3 is a block diagram of the second electronic controller 125 of the vehicle 105. The second electronic controller 125 is, in general, similar to the first electronic controller 110. Therefore, not all details of its architecture and connections to other components will be described. The second electronic controller 125 includes, among other things, a second electronic processor 305 (for example a programmable electronic microprocessor, microcontroller, or similar device) and a second memory 310. The second memory 310 is, for example, a non-transitory, machine readable memory. The second electronic controller 125 also includes a second communication interface 315.

The second electronic processor 305 is communicatively connected to the second memory 310 and the second communication interface 315. The second memory 310 includes an attention neural network model trainer 320 and a semantic segmentation neural network model trainer 325. The attention neural network model trainer 320, for example, is software or a set of computer-readable instructions that receives input from the first electronic controller 110 and trains an attention neural network model with the received input to create a trained attention neural network model. The semantic segmentation network model trainer 325, for example, is software or a set of computer-readable instructions that receives input from the first electronic controller 110 and trains a semantic segmentation neural network model with the received input to create a trained semantic segmentation neural network model. In the illustrated example, the input is from the first electronic controller 110 located in vehicle 105. However, in other embodiments, multiple vehicles may send the second electronic controller 125 inputs.

Like the first electronic controller 110, the second electronic controller 125 may be implemented in several independent controllers each configured to perform specific functions or sub-functions. Additionally, the second electronic controller 125 may contain sub-modules that include additional electronic processors, memory, or application specific integrated circuits (ASICs) for handling communication functions, processing of signals, and application of the methods listed below. In addition, the second electronic controller 125 includes additional, fewer, or different components than those shown.

Figure 4:
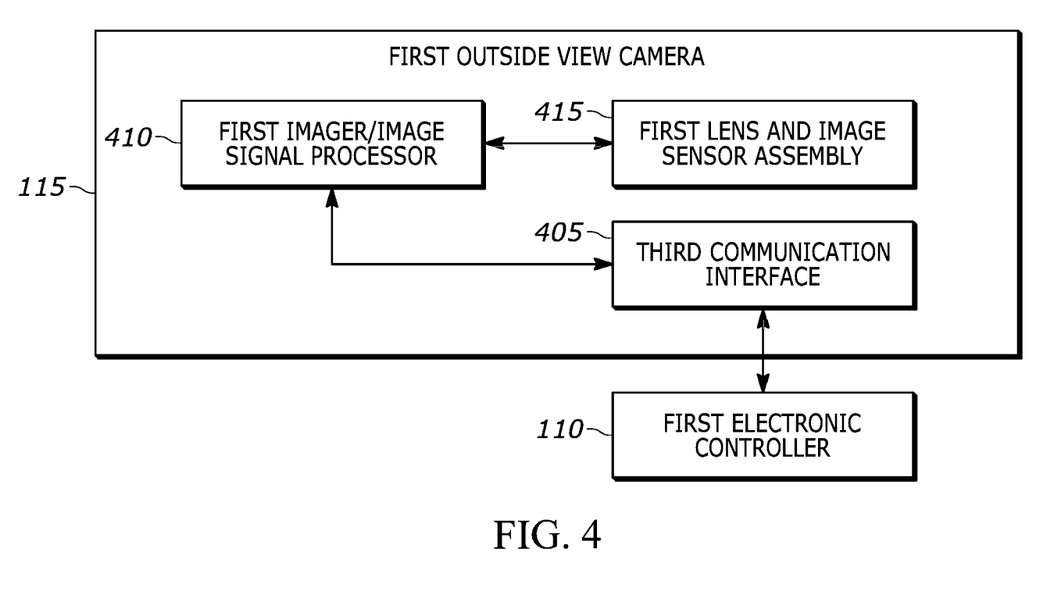
FIG. 4 is a block diagram of an outside view camera of the system of FIG. 1 according to one embodiment.

FIG. 4 is a block diagram of the first outside view camera 115 of the vehicle 105. The first outside view camera 115 includes, among other things, a third communication interface 405, a first image signal processor 410, and a first lens and image sensor assembly 415. In the system 100, the camera is a front facing camera that is configured in such a way that the images provided are similar to that of a driver's view through a windshield outside the vehicle 105.

Figure 5:
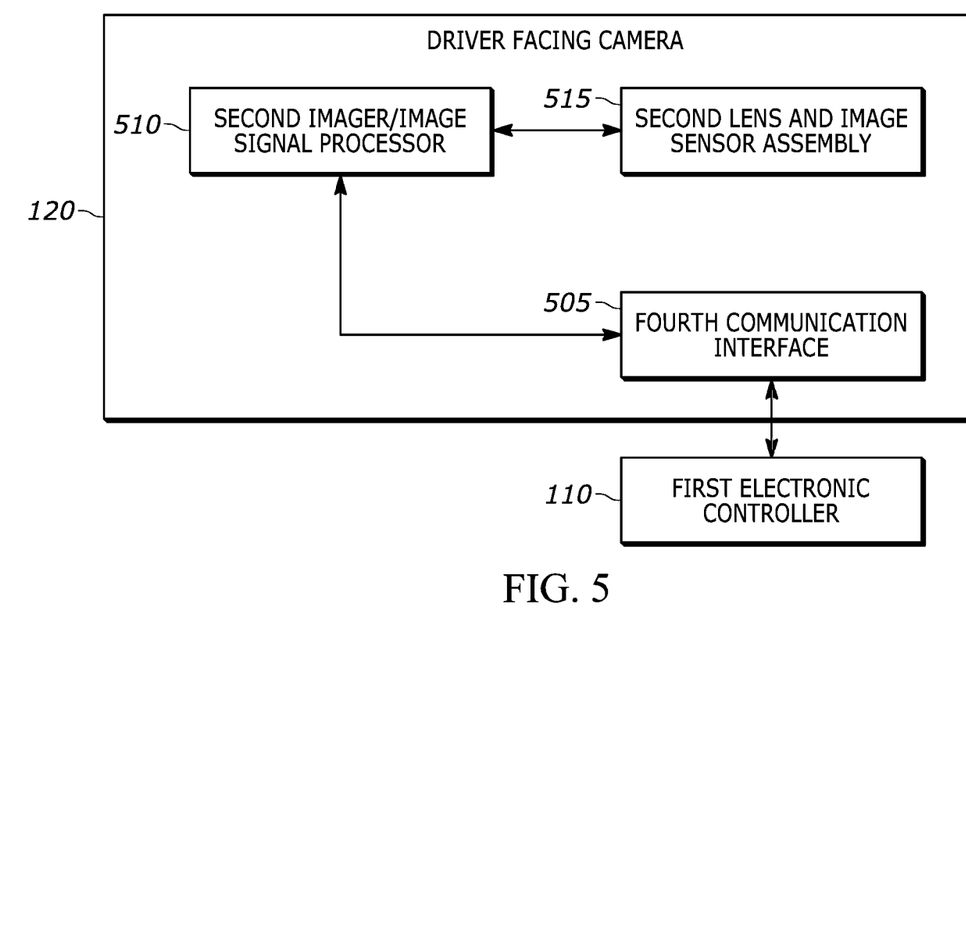
FIG. 5 is a block diagram of driver-facing camera of the system of FIG. 1 according to one embodiment.

FIG. 5 is a block diagram of the driver-facing camera 120 of the vehicle 105. The driver-facing camera 120 includes, among other things, a fourth communication interface 505, a second image signal processor 510, and a second lens and image sensor assembly 515. As its name implies, the driver-facing camera 120 faces the driver and is configured to track the driver eye movements. As will be explained in greater detail, tracked eye movements are used to calibrate images from the first outside view camera 115.

Figure 6:
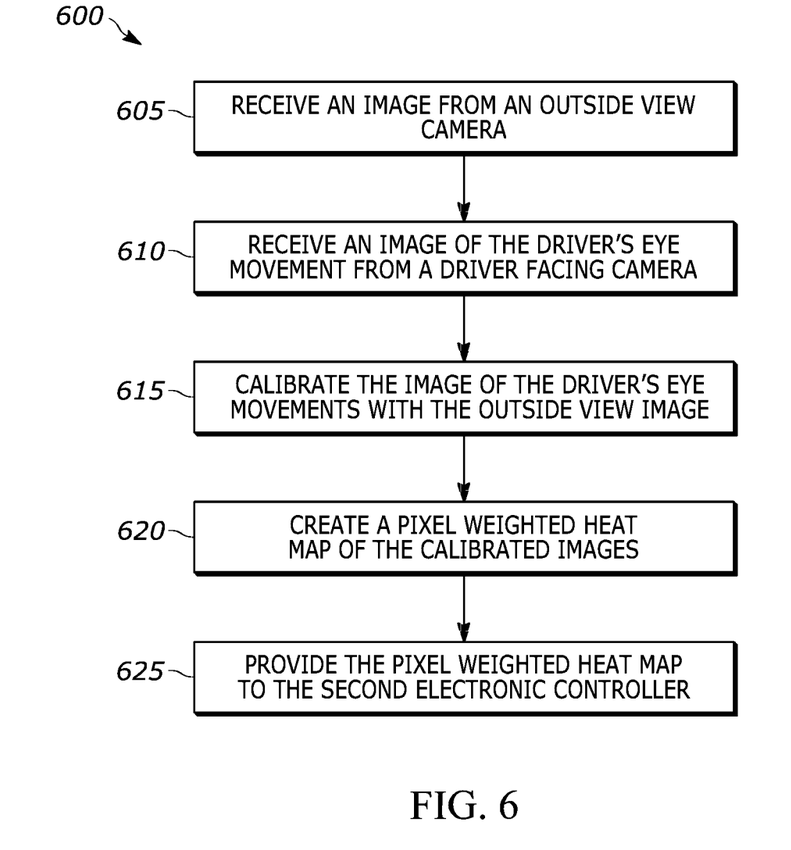
FIG. 6 is a flowchart of a method of using an image calibration engine of the electronic controller of FIG. 2 to receive input from the cameras of FIG. 1 and FIG. 2 and create a pixel weighted heat map based on the input according to one embodiment.

Images captured by the first outside view camera 115 and the driver-facing camera 120 are provided to the image calibration engine 220. FIG. 6 illustrates an example method 600 of the image calibration engine 220. The image calibration engine 220 controls the calibration of the images and creates a calibrated heat map. While semantic segmentation network models are currently trained only with labels categorizing objects within an image and predictions of which label each pixel is relevant to, doing so creates a semantic segmentation model where each pixel or group of pixels in an object has equal relevance. However, a human mind does not process each object in a field of view with equal relevance. Thus, looking at a driver eye movement in relation to the images captured by the first outside view camera 115 is beneficial and provides a second level of relevance or interest information for pixels within an object contained within images captured by the first outside view camera 115.

At step 605, the first electronic processor 205 receives a first image from the first outside view camera 115. The first image is used as an artificial representation of the driver's view. At step 610, a second image of the driver's eye movement is received. Next, a calibration is performed to determine which pixels correspond to the eye movement of the driver (step 615). The calibration of pixels to eye movement is achieved through pixel weighting based on the focus of the driver's gaze (i.e., where the driver is looking). Known techniques for determining the focus of a person's gaze may be used in embodiments described. With regard to weighting, in an example, if the driver is looking at a pedestrian crossing the road, the pedestrian is weighted heavier than a bird flying in the sky. In one instance, each pixel in the image from the outside view camera is assigned a weight based on the image of the driver's eye movements. The calibrated images are then processed by the first electronic processor 205 to create a pixel weighted heat map (step 620). In one example, the pixel weighted heat map indicates weights by darkness of color. The darker the color on the heat map the heavier the weight of the corresponding pixel. In other embodiments, the weighting of pixels is represented in different forms. For example, one form may be a number location of pixels with corresponding weight values. Once the images are calibrated, the representation of the calibrated images (for example, the heat map) is provided to the second electronic controller 125 (step 625). In one embodiment, the representation of the calibrated images may be provided to the second electronic controller 125 after being created. However, in other embodiments the calibrated images may be stored in a memory storage location and transferred to the second electronic controller 125 at a later time.

Figure 7:
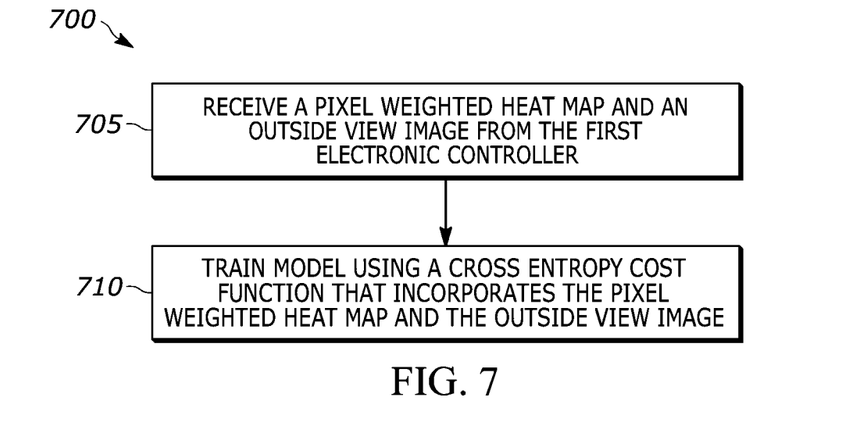
FIG. 7 is a flowchart of a method of using an attention neural network model trainer of the electronic controller of FIG. 3 to incorporate the pixel weighted heat map and the outside view image with a cost function used in training the attention neural network model according to one embodiment.

FIG. 7 illustrates an example method 700 of the attention neural network model trainer 320. At step 705, the attention neural network model trainer 320 receives a pixel weighted heat map and an outside view image captured by the first outside view camera 115. As noted, semantic segmentation models are currently trained using labels to classify pixels in object groups and do not take into account pixel weighting. In the example embodiment, the pixel weighted heat map is used as a classifying label and the outside view image as the input. Training may be performed by using a cross entropy cost function. The second electronic processor 305 trains the model using a cost function that incorporates the weighting of pixels presented by the pixel weighted heat map (step 710).

Figure 8:
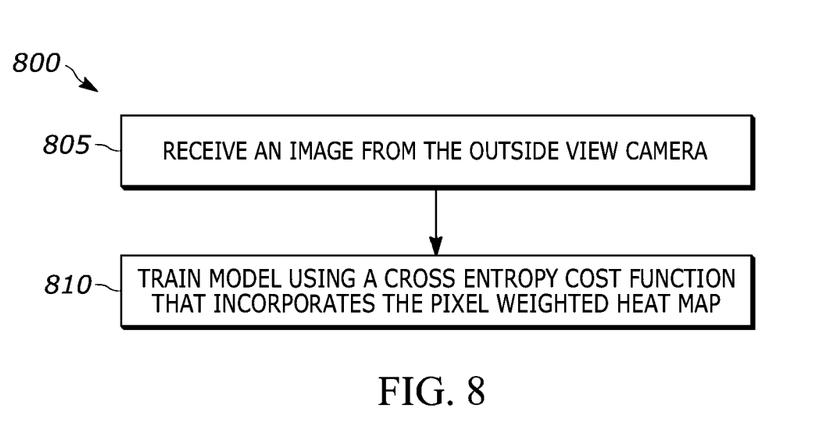
FIG. 8 is a flowchart of a method of using a semantic segmentation neural network model trainer of the electronic controller of FIG. 3 to incorporate the outside view image in training the semantic segmentation neural network model according to one embodiment.

FIG. 8 illustrates an example method 800 of the semantic segmentation neural network model trainer 325. At step 805, the semantic segmentation neural network model trainer 325 receives an outside view image from the first outside view camera 115. The second electronic processor 305 trains the model using a cross entropy cost function that incorporates the outside view image (step 810). Although a cross entropy cost function is used in one example, in other embodiments, a different cost function may be used. The trained semantic segmentation neural network model provides a mechanism to analyze images and categorize segmentation features in an image.

Figure 9:
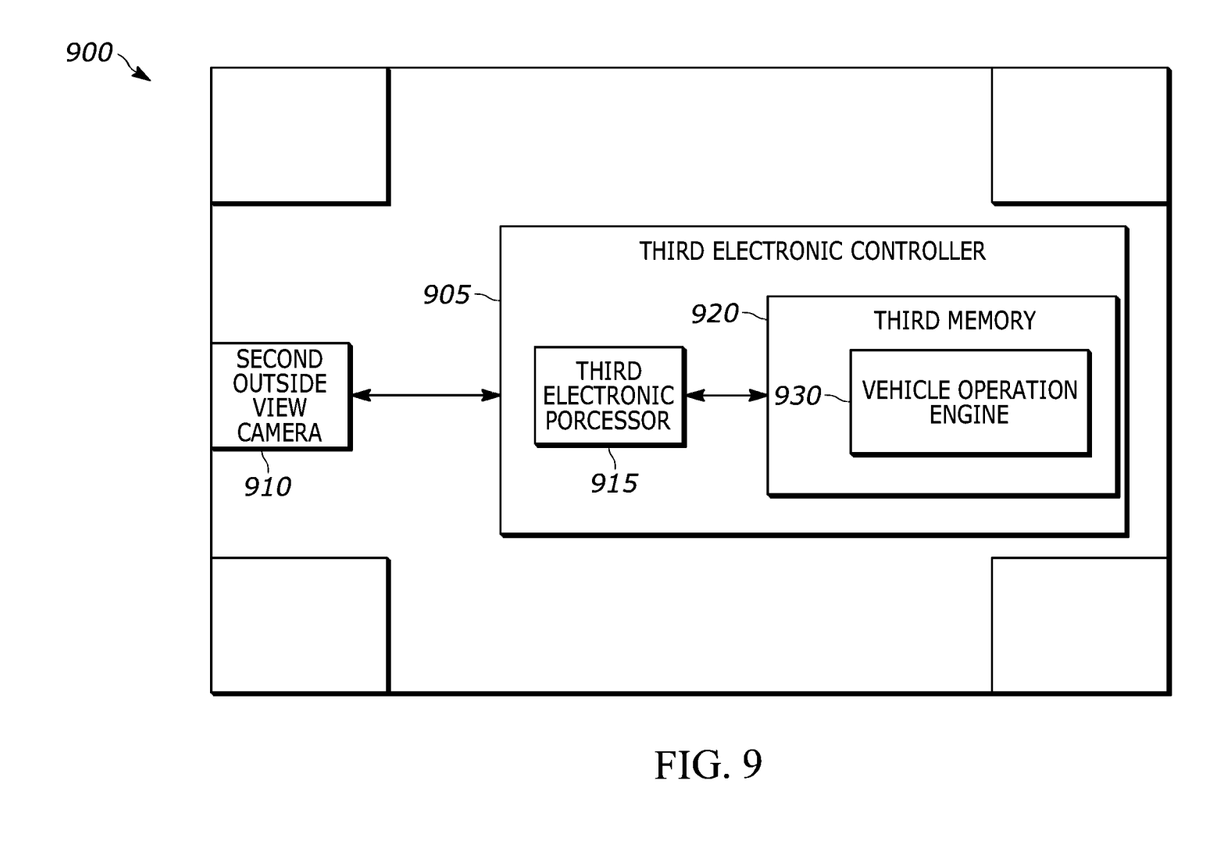
FIG. 9 a block diagram of a system for operating an autonomous vehicle using a semantic segmentation classifier according to one embodiment.

After the trained semantic segmentation neural network model and the trained attention neural network model have been created, vehicles with autonomous driving functionality may incorporate the models in autonomous and semi-autonomous driving systems and a vehicle may be operated in accordance with the models. FIG. 9 illustrates an automated vehicle system 900 for operating an automated driving vehicle. In the example illustrated, the automated vehicle system 900 includes a similar architecture as the vehicle 105 of FIG. 1. However, the automated vehicle system 900 does not have a driver facing camera. The hardware components within the automated vehicle system 900 include a third electronic controller 905 and a second outside view camera 910. The third electronic controller 905 is communicatively connected to the second outside view camera 910.

The second outside view camera 910 is configured to capture images outside of the automated driving vehicle. The second outside view camera 910 provides data (images) to the third electronic controller 905 of the system 900. The third electronic controller 905 includes, among other things, a third electronic processor 915 (for example a programmable electronic microprocessor, microcontroller, or similar device) and a third memory 920. Communication connections between the third electronic processor 915 and the third memory 920 are similar to the connections between the electronic processors and memory described above. The third memory 920 is, for example, a non-transitory, machine readable memory. The third memory 920 includes a vehicle operation engine 930. The vehicle operation engine 930 is, for example, software or a set of computer-readable instructions that processes input from the second outside view camera 910 and provides generated image features to autonomous and semi-autonomous driving systems. The third electronic processor 915 in coordination with software stored in the third memory 920 (for example, the software described above) is configured to implement one or more of the methods described herein.

Figure 10:
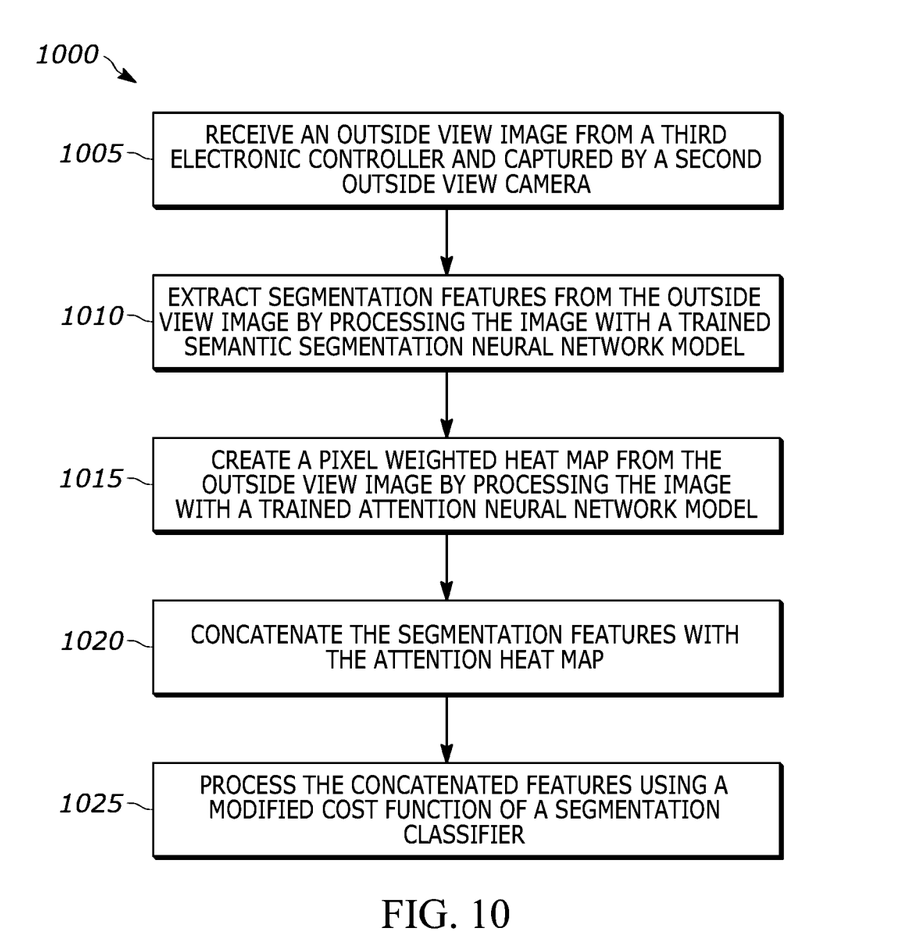
FIG. 10 is a flowchart of a method of using a vehicle operation engine of the third electronic controller of FIG. 9 to receive an outside view image from a second outside view camera and process the image through trained models to operate a vehicle.

FIG. 10 illustrates an example method 1000 of the vehicle operation engine 930 that controls autonomous and semi-autonomous driving systems that include so-called advanced driver assistance systems (ADASs). Examples of ADASs include lane detection and lane keep systems, forward collision warning and mitigation systems, object detection systems, and free space detection systems. At step 1005 an outside view image captured by the second outside view camera 910 is received from a third electronic controller 905. The outside view image is then processed by the trained semantic segmentation neural network model that was trained in the method 800. The processing of the outside view image with the semantic segmentation neural network model extracts segmentation features (step 1010). In one example, the extraction of segmentation features identifies the presence of a vehicle. The outside view image is also processed by the trained attention neural network model that was trained in the method 700. A pixel weighted heat map is created from the processing of the outside view image with the attention neural network model (step 1015). The pixel weighted heat map represents a prediction made by the attention neural network model indicating an importance of pixels in an image based on training from data of a driver's eye movements. After the pixel weighted heat map and the segmentation features have been acquired, the features and heat map are concatenated (step 1020). Next, the concatenated heat map and segmentation features are processed with a modified cost function of a segmentation classifier (step 1025). In some embodiments, the cost function of the segmentation classifier may be modified to accept both inputs without the inputs being concatenated. The segmentation classifier uses a cross entropy cost function that incorporates the weighting of pixels presented by the pixel weighted heat map as well as the segmentation features. An example cross entropy cost function is a follows:

$$\Sigma_{pixel}\Sigma_{class} y_{true} \log(y_{predict}) \quad \text{(Equation 1)}$$

Using the pixel weighted heat map, Equation 1 is changed as follows:

$$\Sigma_{pixel}\Sigma_{class} y_{true} w_{pixel} \log(y_{predict})$$

Here $w_{pixel}$ is the weight associated with each pixel determined based on the weighting performed as part of the correlation of gaze information from the driver-facing camera 120 to the images from the first outside camera 115 determined by the calibration engine 220 in method 600. Next the vehicle is operated in accordance with the processing of the concatenated segmentation features and the pixel weighted heat map with the segmentation classifier.

Although a cross entropy cost function is used in one example, in other embodiments, a different cost function may be used and altered to incorporate the weighting of pixels determined by the image calibration engine 220.

Figure 11:
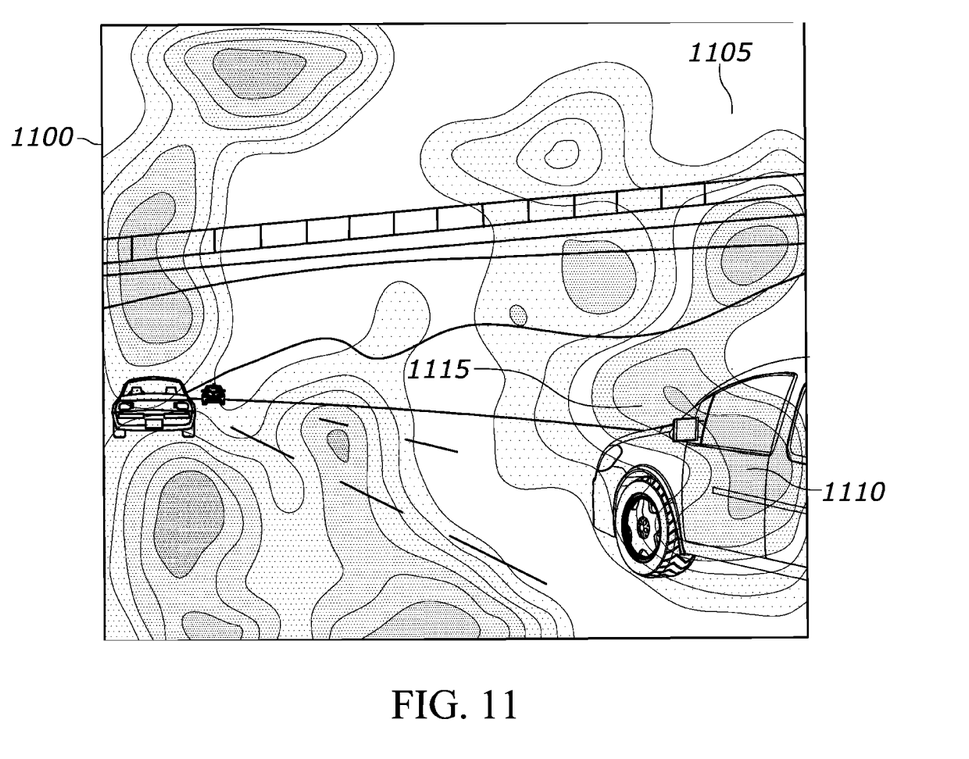
FIG. 11 is a conceptual illustration of a labeled heat map created in the method of FIG. 6 to be used in training the attention neural network model.

The weighting of pixels determined by the image calibration, as previously stated, is presented as a pixel weighted heat map. FIG. 11 is an illustration of a pixel weighted heat map 1100 according to one embodiment. In the example provided, the degree of shading of a region represents the weight of the pixels in the region. For example, the area without shading 1105 has a very low or no weighting, while the darkest shaded region 1110 has the highest weight. In the illustrated example, pixels are grouped into regions of an assigned weight. However, the pixels in the group may have actual weights that are within a tolerance of the assigned weight, for example within 1% of the assigned weight. In other embodiments, regions do not exist and the weighting of the pixels are the actual values that are received from calibrating a driver's eye movements with the outside view image.

By adding weights to the pixels, autonomous and semi-autonomous driving functionality is improved by, for example, ignoring objects that are less relevant and taking action (for example, braking, steering, or accelerating) based on objects of higher relevance.

While a particular order of steps is indicated in the methods illustrated in FIGS. 6-8 and 10, the timing, sequence, and inclusion of steps may vary where appropriate without negating the purpose and advantages of the examples provided.

Thus, the embodiments described herein provide, among other things, a system and a method for capturing and calibrating images to create a representation of calibrated images indicating weighting of pixels based on relevance. Various features and advantages of the embodiments are set forth in the following claims.

What is claimed is:

1. A system of creating a trained semantic segmentation neural network model and a trained attention neural network model to operate a vehicle, the system comprising:
an outside view camera;
a driver-facing camera;
one or more electronic controllers configured to:
receive an image from the outside view camera;
receive an image of a driver's eye movements from the driver-facing camera;
calibrate the image of the driver's eye movements with the image from the outside view camera to create calibrated images;
create a pixel weighted heat map of the calibrated images;
create the trained semantic segmentation neural network model using the image from the outside view camera;
create the trained attention neural network model using the pixel weighted heat map and the image from the outside view camera; and
operate the vehicle using the trained semantic segmentation neural network model and the trained attention neural network model.

2. The system according to claim 1, wherein the outside view camera is a front facing camera.

3. The system according to claim 1, wherein the one or more electronic controllers are configured to calibrate the image of the driver's eye movements with the image from the outside view camera by assigning each pixel in the image from the outside view camera with a weight based on the image of the driver's eye movements.

4. The system according to claim 1, wherein creating the trained attention neural network model includes using the pixel weighted heat map as a classifying label and the outside view image as an input.

5. The system according to claim 1, wherein a first electronic controller receives the image from the outside view camera; receives the image of a driver's eye movements from the driver-facing camera; calibrates the image of the driver's eye movements with the image from the outside view camera to create calibrated images; and creates the pixel weighted heat map of the calibrated images and wherein a second electronic controller receives the pixel weighted heat map of the calibrated images and the image from the outside view camera.

6. The system according to claim 5, wherein the second electronic controller is configured to receive pixel weighted heat maps from multiple vehicles.

7. The system according to claim 5, wherein the second electronic controller is configured to create the trained semantic segmentation neural network model and the trained attention neural network model with a cost function that incorporates the pixel weighted heat map.

8. The system according to claim 7, wherein the second electronic controller is further configured to train a semantic segmentation classifier with a cost function that incorporates the pixel weighted heat map.

9. A method of creating a trained semantic segmentation neural network model and a trained attention neural network model to operate a vehicle, the method comprising:
receiving, via one or more electronic controllers, an image from an outside view camera;
receiving, via the one or more electronic controllers, an image of a driver's eye movements from a driver-facing camera;
calibrating, via the one or more electronic controllers, the image of the driver's eye movements with the image from the outside view camera to create calibrated images;
creating, via the one or more electronic controllers, a pixel weighted heat map of the calibrated images;
creating, via the one or more electronic controllers, the trained semantic segmentation neural network model using the image from the outside view camera;
creating, via the one or more electronic controllers, the trained attention neural network model using the pixel weighted heat map and the image from the outside view camera; and
operating, via the one or more electronic controllers, the vehicle using the trained semantic segmentation neural network model and the trained attention neural network model.

10. The method according to claim 9, wherein calibrating the image of the driver's eye movements with the image from the outside view camera further comprises assigning each pixel in the image from the outside view camera with a weight based on the image of the driver's eye movements.

11. The method according to claim 9, wherein creating the trained attention neural network model includes using the pixel weighted heat map as a classifying label and the outside view image as an input.

12. The method according to claim 9, wherein
receiving an image from the outside view camera;
receiving an image of a driver's eye movements from the driver-facing camera;
calibrating the image of the driver's eye movements with the image from the outside view camera to create calibrated images; and
creating a pixel weighted heat map of the calibrated images are performed via a first electronic controller and wherein the method further comprises providing, via a first electronic controller, the pixel weighted heat map of the calibrated images to a second electronic controller.

13. The method according to claim 12, further comprising receiving from multiple vehicles providing pixel weighted heat maps.

14. The method according to claim 12, wherein operating, via the one or more electronic controllers, the vehicle using the trained semantic segmentation neural network model and the trained attention neural network model, is performed via the second electronic controller.

15. The method according to claim 14, further comprising training, via the second electronic controller, a semantic segmentation classifier with a cost function that incorporates the pixel weighted heat map.

16. A system of operating a vehicle using a trained semantic segmentation neural network model and a trained attention neural network model, the system comprising:
an outside view camera;
one or more electronic controllers configured to:
receive an image from the outside view camera;
process the image from the outside view camera with the trained semantic segmentation neural network model to extract segmentation features;
process the image from the outside view camera with the trained attention neural network model to create a pixel weighted heat map;
concatenate the segmentation features with the pixel weighted heat map;
process the concatenated segmentation features and pixel weighted heat map with a segmentation classifier; and
operate the vehicle in accordance with the processing of the concatenated segmentation features and pixel weighted heat map with the segmentation classifier.

17. The system according to claim 16, wherein processing the concatenated segmentation features and pixel weighted heat map with the segmentation classifier includes using a modified cost function that incorporates the pixel weighted heat map.

* * * * *

UNITED STATES PATENT AND TRADEMARK OFFICE
CERTIFICATE OF CORRECTION

| | | |
|---|---|---|
| PATENT NO. | : 10,929,715 B2 | |
| APPLICATION NO. | : 16/388190 | |
| DATED | : February 23, 2021 | |
| INVENTOR(S) | : Krishna Mohan Chinni | |

It is certified that error appears in the above-identified patent and that said Letters Patent is hereby corrected as shown below:

On the Title Page

Item [73], insert --Robert Bosch GmbH, Stuttgart (DE)--

Signed and Sealed this
Fourteenth Day of February, 2023

*Katherine Kelly Vidal*

Katherine Kelly Vidal
*Director of the United States Patent and Trademark Office*